US010878228B2

United States Patent
Mimatsu et al.

(10) Patent No.: US 10,878,228 B2
(45) Date of Patent: Dec. 29, 2020

(54) POSITION ESTIMATION SYSTEM

(71) Applicant: Hitachi, Ltd., Tokyo (JP)

(72) Inventors: Yasuyuki Mimatsu, Tokyo (JP); Katsuyuki Nakamura, Tokyo (JP); Toshio Kamimura, Tokyo (JP); Akinobu Watanabe, Tokyo (JP)

(73) Assignee: HITACHI, LTD., Tokyo (JP)

( * ) Notice: Subject to any disclaimer, the term of this patent is extended or adjusted under 35 U.S.C. 154(b) by 98 days.

(21) Appl. No.: 16/167,565

(22) Filed: Oct. 23, 2018

(65) Prior Publication Data
US 2019/0138800 A1 May 9, 2019

(30) Foreign Application Priority Data

Nov. 6, 2017 (JP) ................. 2017-213942

(51) Int. Cl.
*G06K 9/00* (2006.01)
*G06T 7/73* (2017.01)
*H04N 5/232* (2006.01)

(52) U.S. Cl.
CPC .......... *G06K 9/00342* (2013.01); *G06T 7/73* (2017.01); *H04N 5/23216* (2013.01)

(58) Field of Classification Search
CPC .................................................. G06K 9/00342
USPC ........................................................ 382/103
See application file for complete search history.

(56) References Cited

U.S. PATENT DOCUMENTS

| | | | |
|---|---|---|---|
| 8,503,720 B2 | 8/2013 | Shotton et al. | |
| 2008/0027591 A1* | 1/2008 | Lenser ................. | G05D 1/0251 701/2 |
| 2014/0282877 A1* | 9/2014 | Mahaffey .............. | H04W 12/08 726/3 |
| 2016/0307480 A1* | 10/2016 | Carlus ..................... | G06F 3/147 |

* cited by examiner

*Primary Examiner* — Michael R Neff
(74) *Attorney, Agent, or Firm* — Mattingly & Malur, PC

(57) ABSTRACT

A position information server receives position information of a subject from a distance sensor, decides a position information generation process to be executed by the distance sensor on the basis of the received position information, and transmits instruction information related to the position information generation process to the distance sensor.

10 Claims, 15 Drawing Sheets

FIG.5

SENSOR TABLE

| SENSOR # | IP ADDR. | FIELD-OF -VIEW REGION | POSITION REFERENCE | PHOTOGRAPHING REGION SIZE | PHOTO- GRAPHING RANGE | TIME INTERVAL | PHOTO- GRAPHING MODE | RESOLUTION MODE | FRAME RATE | SUBJECT # |
|---|---|---|---|---|---|---|---|---|---|---|
| 1 | | | | | | | | | | |
| 2 | | | | | | | | | | |
| | | | | | | | | | | |

MONITORING REGION TABLE

| REGION # | REGION RANGE | DEFAULT RESOLUTION | DEFAULT FRAME RATE | MONITORING RESOLUTION | MONITORING FRAME RATE |
|---|---|---|---|---|---|
| 1 | | | | | |
| 2 | | | | | |
| | | | | | |

206

PHOTOGRAPHING PARAMETER

| 801 | 802 | 803 | 804 | 805 | 806 | 807 |
|---|---|---|---|---|---|---|
| RESOLUTION | FRAME RATE | PHOTOGRAPHING RANGE | TIME INTERVAL | PHOTOGRAPHING MODE | ENTIRE IMAGE TRANSMISSION TIME | IMAGE TRANSMISSION TIME |
|  |  |  |  |  |  |  |

FIG.15

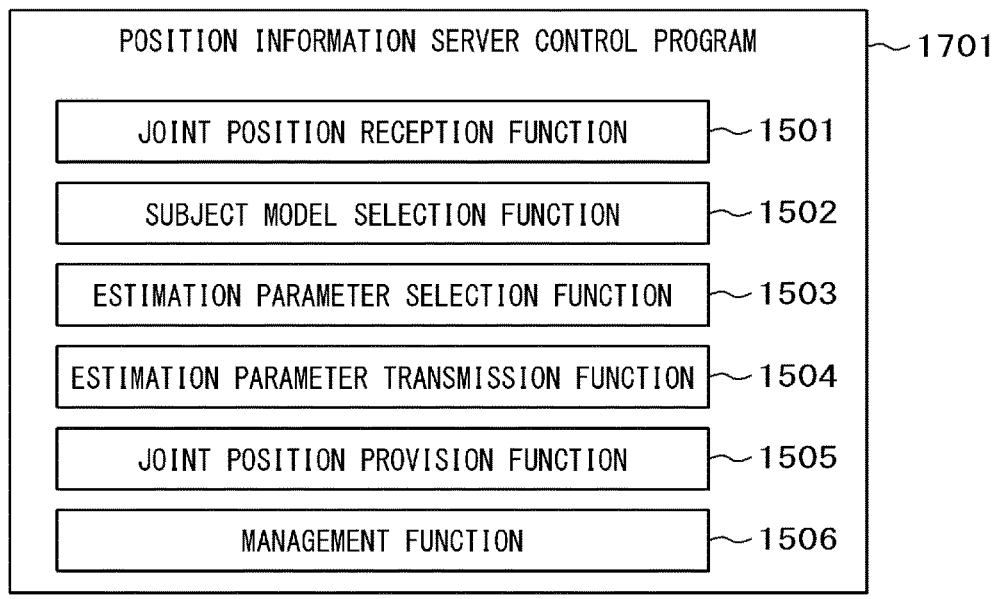

POSITION INFORMATION SERVER CONTROL PROGRAM ~1701
- JOINT POSITION RECEPTION FUNCTION ~1501
- SUBJECT MODEL SELECTION FUNCTION ~1502
- ESTIMATION PARAMETER SELECTION FUNCTION ~1503
- ESTIMATION PARAMETER TRANSMISSION FUNCTION ~1504
- JOINT POSITION PROVISION FUNCTION ~1505
- MANAGEMENT FUNCTION ~1506

FIG.16

SENSOR TABLE

| SENSOR # (1601) | IP ADDR. (1602) | FIELD-OF-VIEW REGION (1603) | ESTIMATION SUBJECT MODEL # (1604) | DETECTION SUBJECT MODEL # (1605) | SUBJECT MODEL DETECTION TIME (1606) | SWITCHING INTERVAL (1607) | SUBJECT # (1608) |
|---|---|---|---|---|---|---|---|
| 1 | | | | | | | |
| 2 | | | | | | | |
|   | | | | | | | |

1702

SUBJECT MODEL TABLE

| SUBJECT MODEL # | MINIMUM SHOULDER WIDTH | MAXIMUM SHOULDER WIDTH | MINIMUM HEADER-FLOOR DISTANCE | MAXIMUM HEADER-FLOOR DISTANCE | NUMBER OF PERSONS | DENSITY |
|---|---|---|---|---|---|---|
| 1 | | | | | | |
| 2 | | | | | | |
| | | | | | | |

ESTIMATION PARAMETER TABLE

| SUBJECT MODEL # (1901) | MINIMUM SHOULDER-ELBOW DISTANCE (1902) | MAXIMUM SHOULDER-ELBOW DISTANCE (1903) | ESTIMATOR (1904) |
|---|---|---|---|
| 1 | | | |
| 2 | | | |
| | | | |

SUBJECT TABLE

| SUBJECT # (2001) | SENSOR # (2002) | HEAD POSITION (2003) | RIGHT SHOULDER POSITION (2004) | LEFT SHOULDER POSITION (2005) | RIGHT ELBOW POSITION (2006) | ... (2007) |
|---|---|---|---|---|---|---|
| 1 | | | | | | |
| 2 | | | | | | |
| | | | | | | |

SUBJECT TABLE

| 2601 | 2602 | 2603 | 2604 | 2605 | 2606 | 2607 |
|---|---|---|---|---|---|---|
| SUBJECT # | SENSOR # | HEAD POSITION | RIGHT SHOULDER POSITION | LEFT SHOULDER POSITION | ... | SUBJECT MODEL # |
| 1 | | | | | | |
| 2 | | | | | | |
| | | | | | | |

1705

POSITION ESTIMATION SYSTEM

CROSS-REFERENCE TO RELATED APPLICATION

The present application claims priority from Japanese application JP 2017-213942, filed on Nov. 6, 2017, the contents of which is hereby incorporated by reference into this application.

TECHNICAL FIELD

The present invention relates to a position estimation system.

BACKGROUND ART

A technique of estimating a position of a subject from a distance image captured by a distance sensor such as a time of flight (TOF) camera or a stereo camera is known.

For example, a method of calculating a probability of relevance between each of pixels of a distance image of a human body captured by a distance sensor and each of parts of the body and estimating a joint position of a subject is disclosed in Patent Document 1.

PATENT DOCUMENT

Patent Document 1: U.S. Pat. No. 8,503,720

SUMMARY OF THE INVENTION

In a case in which there are a plurality of distance sensors that image a subject, aggregating position information in a position information server connected with a plurality of distance sensors via a network and providing position information from the position information server to various applications are commonly performed.

However, in a case in which measuring of a distance to the subject is performed through the distance sensor, and aggregating of the distance images transmitted from a plurality of distance sensors and estimating of the joint position are performed through the position information server, distance image data transmitted by a plurality of distance sensors applies compression to a network band, an information amount available for position estimation decreases, and subject position estimation accuracy decreases.

Further, since computing resources of the distance sensor are generally much smaller than those of the position information server, resources available for the position estimation are limited, and the subject position estimation accuracy decreases.

A problem of the decrease in the subject position estimation accuracy occurring when the aggregating of the distance images transmitted from a plurality of distance sensors and the estimating of the joint position are performed through the position information server is taken into consideration in Patent Document 1.

It is an object of the present invention to improve the subject position estimation accuracy in the position estimation system.

The position estimation system of one aspect of the present invention is a position estimation system including at least one distance sensor and a position information server which are connected via a network, wherein the distance sensor measures a distance to a subject, generates information related to a position of the subject, and transmits the generated position information to the position information server, and the position information server receives the position information of the subject from the distance sensor, decides a position information generation process to be executed by the distance sensor on the basis of the received position information, and transmits instruction information related to the decided position information generation process to the distance sensor.

According to one aspect of the present invention, it is possible to improve the subject position estimation accuracy in the position estimation system.

BRIEF DESCRIPTION OF THE DRAWINGS

FIG. 5 is a diagram illustrating a configuration of a sensor table of the first example.

FIG. 6 is a diagram illustrating a configuration of a monitoring region table of the first example.

FIG. 15 is a diagram illustrating a configuration of a position information server control program of a second example.

FIG. 16 is a diagram illustrating a configuration of a sensor table of the second example.

FIG. 19 is a diagram illustrating a configuration of an estimation parameter table of the second example.

FIG. 20 is a diagram illustrating a configuration of a joint position table of the second example.

FIG. 26 is a diagram illustrating a configuration of a subject table of the second example.

DESCRIPTION OF EMBODIMENTS

Figure 1:
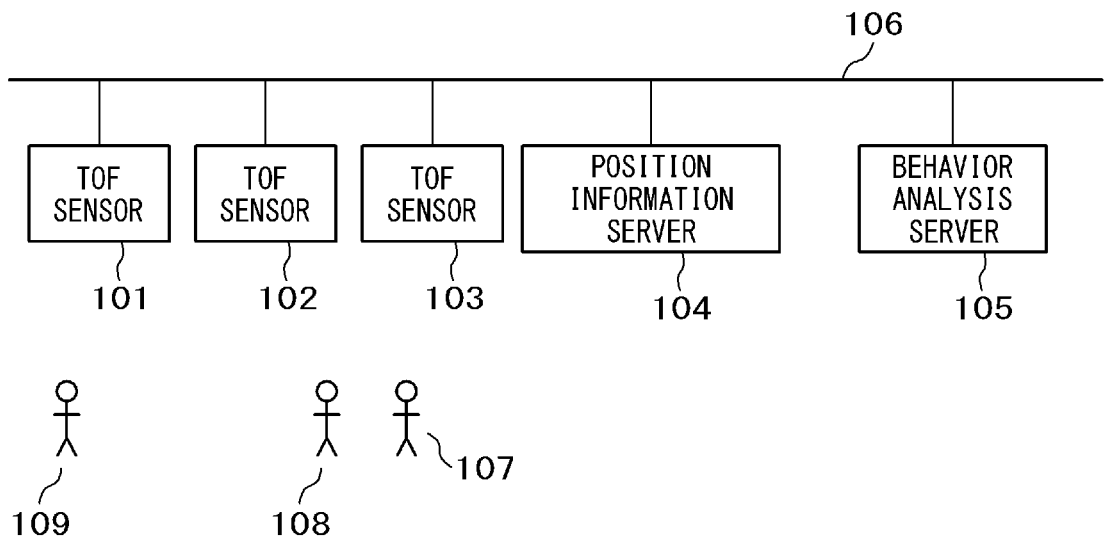
FIG. 1 is a diagram illustrating an overall configuration of a position estimation system.

In a case in which measuring of a distance to a subject is performed through a distance sensor, and aggregating of distance images transmitted from a plurality of distance sensors and estimating of a joint position are performed through a position information server, distance image data transmitted by the plurality of distance sensors applies compression to a network band.

For example, when a distance image size is 640×480, an information amount per pixel is 16 bits, and a frame rate is 30 fps, a band of about 147 Mbps uncompressed per distance sensor is necessary.

For this reason, there is a problem in that real-time analysis is unable to be performed due to communication delay, or an equipment cost increases to secure a network band. Further, if the information amount (the resolution and the frame rate) of the distance image is reduced to reduce a communication volume, there is a problem in that an information amount available for position estimation decreases, and the estimation accuracy decreases.

In a case in which the measuring of the distance to the subject and the estimating of the joint position are performed through the distance sensor, and the aggregating of the joint positions transmitted from the plurality of distance sensors are performed through the position information server, since computing resources of a sensor device are generally much smaller than those of the server, resources available for the joint position estimation are limited.

For example, a CPU drive frequency, the number of CPU cores, and an installed memory capacity of a very common server are several GHz, 10 cores or more, and several ten GB or more, whereas a CPU drive frequency, the number of CPU cores, and an installed memory capacity of each sensor device are about 1 GHz, one or several cores, and several hundred MB to 1 GB. For this reason, there is a problem in that a complicated estimation process is unable to be performed in real time, and the estimation accuracy decreases.

An embodiment is intended to maintain and improve subject position estimation accuracy while reducing an amount of data transmitted from the distance sensor to the position information server.

Further, in an embodiment, a region in the vicinity of a subject which is likely to be necessary in a position estimation process is specified on the basis of a subject position estimation result, and only pixels corresponding to the region are included in the distance image, so that the size of the distance image transmitted from the distance sensor to the position information server is reduced.

Further, in an embodiment, an estimation method with higher accuracy adjusted in accordance with a feature of the subject is specified on the basis of the subject position estimation result, and the estimation method in the distance sensor is changed, so that the estimation accuracy is improved.

Hereinafter, examples will be described with reference to the appended drawings.

First Example

A first example relates to a position estimation system in which measuring of a distance to a subject is performed through a distance sensor, and aggregating of distance images transmitted from a plurality of distance sensors and estimating of joint position are performed through a position information server.

An overall configuration of the position estimation system of the first example will be described with reference to FIG. 1.

Distance sensors (TOF sensors) 101, 102, and 103, a position information server 104, and a behavior analysis server 105 are connected via a network. The TOF sensors 101, 102, and 103 transmit distance images of subjects 107, 108, and 109 to the position information server 104 via a network 106. As a network communication protocol, for example, a TCP/IP can be used.

Respective pixels of distance images transmitted by the TOF sensors 101, 102, and 103 have distances between the TOF sensors 101, 102, and 103 and the subjects 107, 108, and 109. If distances between pixel coordinates of the pixels and the subjects 107, 108, and 109 are known, it is possible to obtain three-dimensional coordinates in a space of each pixel through a general conversion method.

For example, three-dimensional coordinates in which a sensor installation position is defined as an original, and a horizontal direction, a vertical direction, and a depth direction are defined as an X axis, a Y axis, and a Z axis can be obtained for each pixel. The three-dimensional coordinates can be generated on the basis of the distance image received by the position information server 104 or can be generated by the TOF sensors 101, 102, and 103 and transmitted to the position information server as a part of the distance image. In the first example, unless otherwise set forth therein, the TOF sensors 101, 102, and 103 are described as generating and transmitting the three-dimensional coordinates of each pixel as a part of the distance image.

The position information server 104 estimates joint positions of the subjects 107, 108, and 109 on the basis of the received distance images. The behavior analysis server 105 requests the position information server 104 to transmit the joint positions of the subjects 107, 108, and 109 and receives the joint positions of the subjects 107, 108, and 109 via the network 106. The behavior analysis server 105 recognizes and analyzes postures or motions of the subjects 107, 108, and 109 on the basis of the joint positions. Further, the position information server 104 controls processes of the TOF sensors 101, 102, and 103 on the basis of the estimated joint positions.

Figure 2:
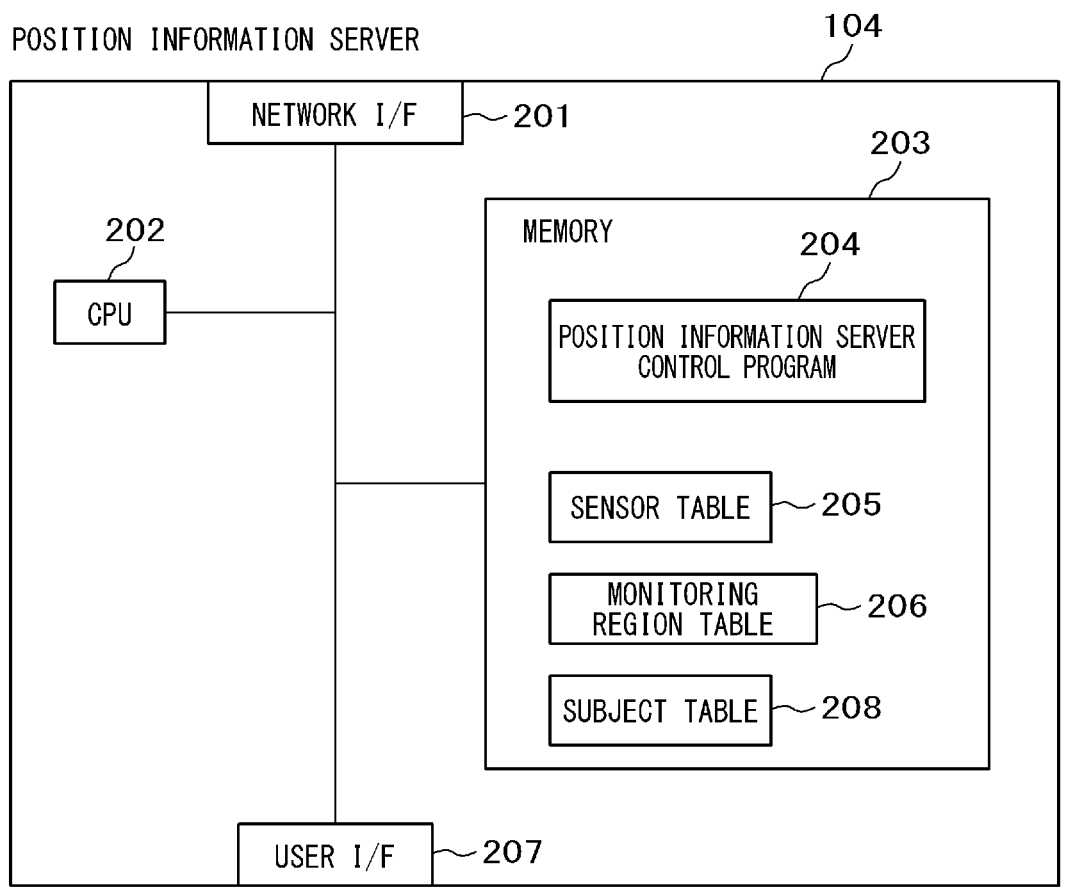
FIG. 2 is a diagram illustrating a configuration of a position information server of a first example.

A configuration of the position information server 104 will be described with reference to FIG. 2.

The position information server 104 includes a network interface 201 that communicates with the TOF sensors 101, 102, and 103 or the behavior analysis server 105, a CPU 202 that executes a control program, a memory 203 that stores programs and various kinds of data, and a user interface 207 that provides a manager with a storage state in the memory 203 and receives a change instruction from the manager.

For example, a display for displaying information, a printer for printing, or a keyboard, a mouse, or the like by which a user inputs an instruction can be used as the user interface 207. The memory 203 includes a position information server control program 204 executed by the CPU 202, a sensor table 205 in which information related to a connected sensor is stored, a monitoring region table 206 in which information related to a region in which entrance of a subject is monitored is stored, and a subject table 208 in which joint positions of respective subjects are stored.

Although not particularly illustrated, the position information server control program 204 initializes each table with an appropriate default value immediately after activated.

Figure 4:
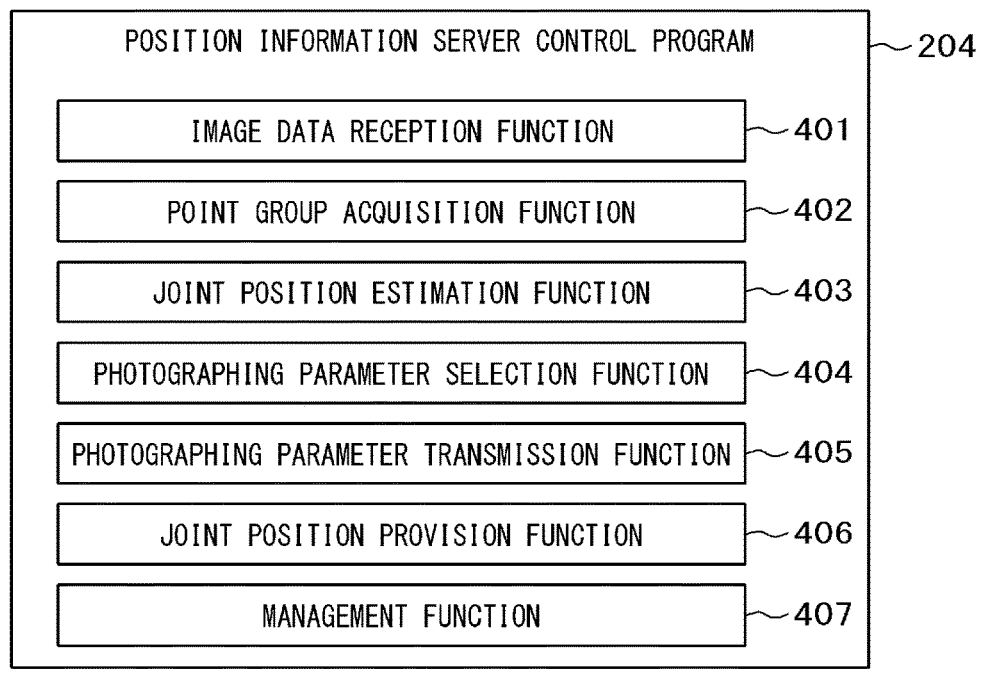
FIG. 4 is a diagram illustrating a configuration of a position information server control program of the first example.

The position information server control program 204 has functions illustrated in FIG. 4.

An image data reception function 401 receives the distance image data transmitted from the TOF sensors 101, 102, and 103 via the network interface 201. A point group acquisition function 402 acquires a position of a point group corresponding to each pixel included in the received distance image, that is, a position of a point group of a subject table surface detected in a viewing space by the sensor.

A joint position estimation function 403 estimates three-dimensional coordinates of various joints from the acquired point groups of the subjects 107, 108, and 109. A photographing parameter selection function 404 selects various kinds of photographing parameters suitable for the TOF sensors 101, 102, and 103 that photograph the subjects 107, 108, and 109 on the basis of estimation results for the joint positions of the subjects 107, 108, and 109.

A photographing parameter transmission function 405 transmits selected parameters to the TOF sensors 101, 102, and 103 via the network interface 201. A joint position provision function 406 transmits the joint position recorded in the subject table 208 via the network interface 201 in response to a request from the behavior analysis server 105.

A management function 407 provides content of the sensor table 205, the monitoring region table 206, and the subject table 208 to the manager via the user interface 207 and changes the sensor table 205 and the monitoring region table 206 to designated values in accordance with an instruction from the manager. For example, ranges of a field-of-view region and a monitoring region of the TOF sensors 101, 102, and 103 and a resolution or a frame rate applied when the subject enters the monitoring region are set to designated values.

The sensor table 205 includes elements illustrated in FIG. 5 for each of the TOF sensors 101, 102, and 103.

In the first example, respective values of a photographing range 506, a photographing mode 508, a resolution 509, a frame rate 510, and a subject number 511 are generated by the position information server control program 204, and the other elements are designated by the manager.

A sensor number 501 is a unique sensor identifier which the manager uses to identify the sensor. An IP address 502 is an address necessary for network communication. A field-of-view region 503 indicates a range of a viewing space of each sensor. A range of the space can be generally expressed in various forms. For example, in a case in which the field-of-view region is a rectangular parallelepiped, it can be indicated by three-dimensional coordinates of two vertices positioned diagonally. In a case in which the field-of-view region is spherical, it can be indicated by three-dimensional coordinates of a center point and a radius. In a case in which a viewing angle and a photographing distance range of the sensor device can be referred to from the position information server control program, the manager may designate only installation coordinates and an installation angle of the sensor which are necessary for specifying the viewing range.

A position reference 504 and a photographing region size 505 indicate a range of the photographing region when the photographing region is limited to a space around the subject other than the entire field of view. For example, the manager designates a type of joint (a head, a waist, or the like) as the position reference 504 and designates lengths in an X axis direction, a Y axis direction, and a Z axis direction as the photographing region size 505, so that a rectangular parallelepiped of a specified distance centered on the joint position becomes the photographing region.

The position information server control program generates the photographing range 506 on the basis of the designated position reference 504 and the photographing region size 505. Similarly to the field-of-view region 503, the photographing range 506 can be indicated in various formats. A time interval 507 is a time interval at which each TOF sensor periodically transmits the distance image obtained by photographing the entire field of view.

A photographing mode 508 indicates photographing modes of the TOF sensors 101, 102, and 103 which the position information server control program decides in accordance with the estimated position of the subject. In general, the sensor device has a plurality of photographing modes and can obtain more accurate photographed data by selecting an appropriate photographing mode in accordance with a situation of the subject. For example, it is possible to select the photographing mode such as a far distance mode in which a distant subject is photographed, a near distance mode specialized for a subject at a short distance, and an intermediate mode therebetween.

In the first example, the photographing modes of the TOF sensors 101, 102, and 103 are designated by the position information server control program in accordance with the distances between the sensor and the subjects 107, 108, and 109. The resolution 509 is a resolution of the distance image to be generated. The frame rate 510 is a frequency at which the distance image is transmitted from the TOF sensors 101, 102, and 103 to the position information server 104.

The subject number 511 indicates identifiers of the subjects 107, 108, and 109 photographed by the TOF sensors 101, 102, and 103. In the monitoring region table 206, the manager designates a space region of interest from a viewpoint of behavior analysis and photographing parameters when the subjects 107, 108, and 109 are present inside and outside the region. A region number 601 is a unique region identifier which the manager uses to specify the monitoring region.

A region range 602 designates a range of each region. Similarly to the field-of-view region 503 and the photographing range 506 of the sensor table 205, a format indicating the range can be indicated in various formats. A default resolution 603 and a default frame rate 604 indicate resolutions and frame rates of the distance images to be selected by the TOF sensors 101, 102, and 103 when the subjects 107, 108, and 109 are not present in the region range 602. A monitoring resolution 605 and a monitoring frame rate 606 indicate resolutions and frame rates of the distance images to be selected by the TOF sensors 101, 102, and 103 when the subjects 107, 108, and 109 are present in the region range 602.

The subject table 208 includes elements illustrated in FIG. 20 for each of the detected subjects 107, 108, and 109. A subject number 2001 is an identifier uniquely identifying each subject. The other elements 2002 to 2007 indicate estimated positions of various kinds of joints of each of the subjects 107, 108, and 109. The joint position is indicated by the three-dimensional coordinates. A joint position provision function 406 of the position information server control program 204 transmits a part or all of content of the subject table 208 in response to a request from the behavior analysis server 105.

Figure 3:
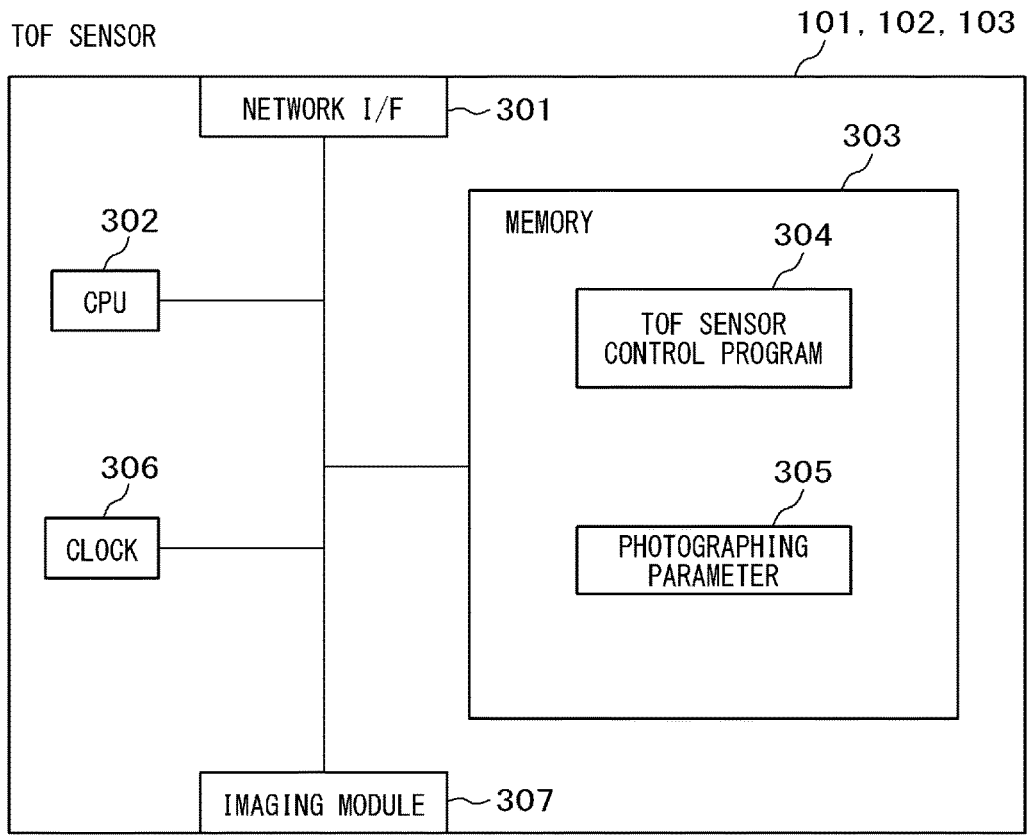
FIG. 3 is a diagram illustrating a configuration of a TOF sensor of the first example.

FIG. 3 illustrates a configuration of each of the TOF sensors 101, 102, and 103.

Each of the TOF sensors 101, 102, and 103 includes a network interface 301 that communicates with the position information server 104, a clock 306 that acquires a time, a CPU 302 that executes a control program, a memory 303 that stores a program or various kinds of data, a clock 306 that acquires a current time, and an imaging module 307 that measures the distances to the subjects 107, 108, and 109 in order to generate the distance images.

The memory 303 stores a TOF sensor control program 304 executed by the CPU 302 and a photographing parameter 305 used for generating the distance image data to be transmitted to the position information server 104.

Figures 7, 8:
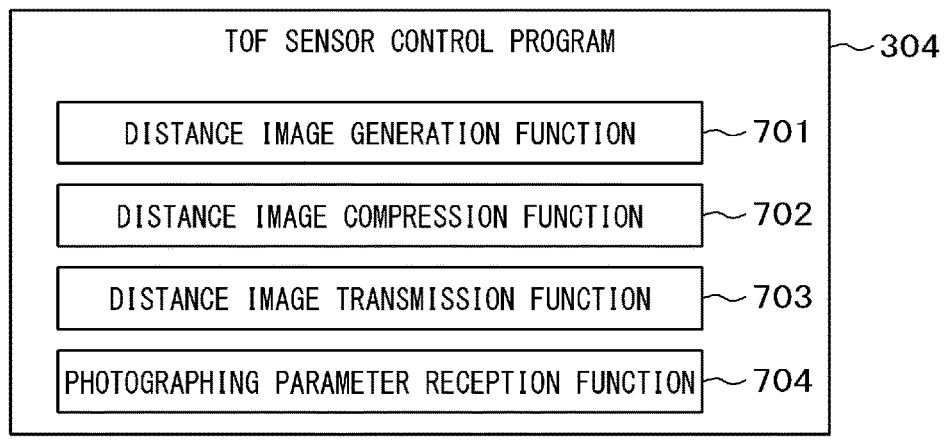
FIG. 7 is a diagram illustrating a configuration of a TOF sensor control program of the first example.
FIG. 8 is a diagram illustrating a configuration of a photographing parameter of a TOF sensor of the first example.

The TOF sensor control program 304 has the respective functions illustrated in FIG. 7. A distance image generation function 701 generates the distance image with the three-dimensional coordinates in which each pixel indicates the distances between the TOF sensors 101, 102, and 103 and the subjects 107, 108, and 109 and the position in the space on the basis of the distances to the subjects 107, 108, and 109 measured by the imaging module 307.

A distance image compression function replaces data of an unnecessary part in the distance image with an invalid value or deletes the data of the unnecessary part and reduces an overall size using a general data compression technique. A distance image transmission function 703 transmits a compressed distance image to the position information server via the network interface 301.

A photographing parameter reception function 704 receives the photographing parameter transmitted from the position information server 104 via the network interface 301 and stores the photographing parameter in the memory 303 as the photographing parameter 305.

The photographing parameter 305 includes elements illustrated in FIG. 8. A resolution 801 and a frame rate 802 are a resolution and a frame rate of the distance image to be generated or transmitted. A photographing range 803, a time interval 804, and a photographing mode 805 are values which are recorded in the sensor table 205 of the position information server for the corresponding TOF sensors 101, 102, and 103.

An entire image transmission time 806 is a time at which the distance image obtained by photographing the entire field of view is transmitted to the position information server most recently. An image transmission time 807 is a time at which the distance image is transmitted most recently regardless of whether or not the entire field of view is limited. The elements other than an entire image transmission time 806 store values designated from the position information server 104. The entire image transmission time 806 and the image transmission time 807 record values generated by the TOF sensor control program 304.

Figure 9:
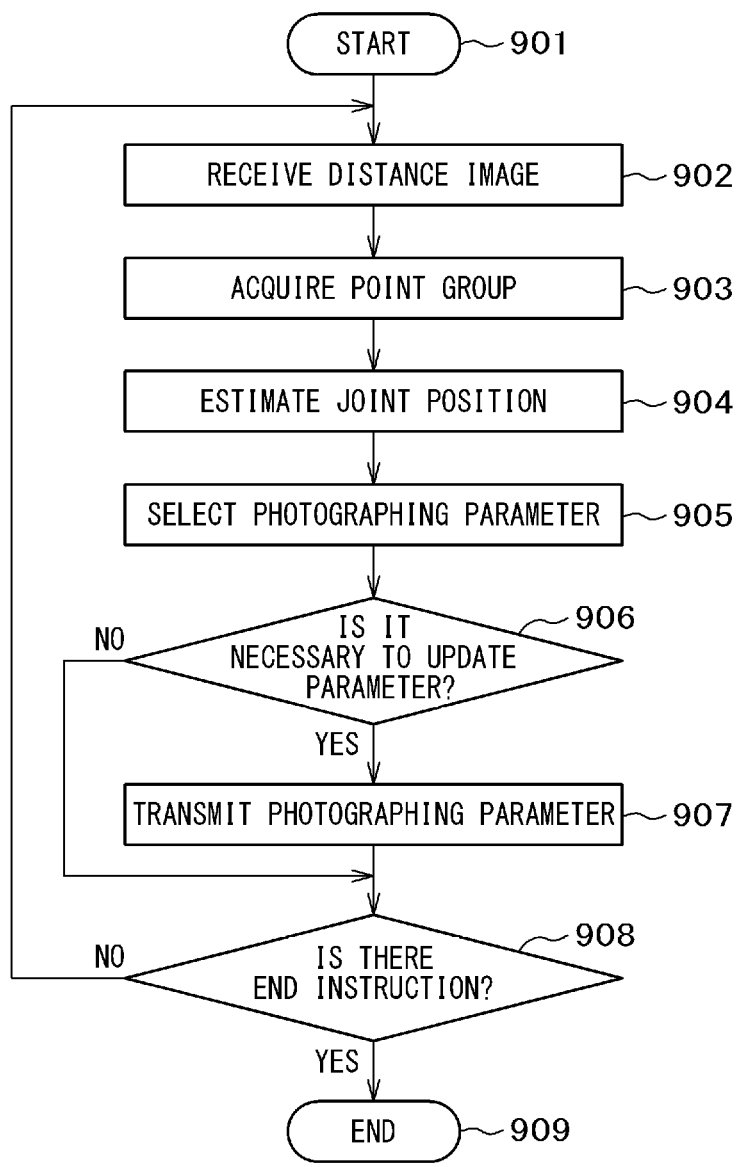
FIG. 9 is a diagram illustrating a flowchart of the position information server control program of the first example.

FIG. 9 illustrates a flow in which the position information server control program 204 gives a process change instruction to the TOF sensors 101, 102, and 103 in order to reduce the communication volumes from the TOF sensors 101, 102, and 103 and improve the position estimation accuracy for the subjects 107, 108, and 109.

If execution of the program is started, the position information server control program 204 receives the distance images from the TOF sensors 101, 102, and 103 (step 902).

The TOF sensors 101, 102, and 103 which have transmitted the distance images can be identified by comparing an IP address of a transmission source with the sensor table. Then, a point group corresponding to each pixel is extracted from the received distance image (step 903).

In a case in which the received distance image is in a compressed state, an expansion process is performed. In a case in which the distance image includes the three-dimensional coordinates of the pixel, a coordinate group thereof is used as a point group without change. In a case in which the three-dimensional coordinates are generated by the position information server, the coordinates of the point group are generated from the distance image.

Then, the joint position of the subject is estimated on the basis of the extracted point group, and the estimation result and the TOF sensor number which has photographed the subject are stored in the subject table 208. Further, the subject numbers of the subjects 107, 108, and 109 whose positions are estimated are recorded in the subject number 511 of the sensor table 205.

The photographing parameters of TOF sensors 101, 102, and 103 are selected on the basis of the estimation result (step 905). When the subjects 107, 108, and 109 are detected, first, the region in the vicinity of the subject necessary when the position estimation is performed with the subsequent distance image is selected as the photographing range on the basis of the estimation result position of the joint designated by the position reference 504 of the sensor table 205 and the range designated by the photographing region size 505.

Further, an appropriate photographing mode is decided on the basis of the distance between the region and each of the TOF sensors 101, 102, and 103. Further, it is checked whether or not the estimated joint position corresponds to the range 602 of any one monitoring region designated in the monitoring region table 206. If the estimated joint position corresponds to the range 602 of any one monitoring region designated in the monitoring region table 206, the monitoring resolution and the monitoring frame rate designated for the region are selected.

If the estimated joint position does not correspond to the range 602 of any one monitoring region designated in the monitoring region table 206, a comparison is performed to see if the range designated by the field-of-view region 503 of each of the TOF sensors 101, 102, and 103 overlaps the range of each monitoring region, and the default resolution and the default frame rate of the monitoring region are selected. If the estimated joint position corresponds to a plurality of monitoring regions, the highest default resolution and the highest frame rate are selected.

In a case in which the subjects 107, 108, and 109 are not detected, the entire field of view is selected as the photographing range, and a predetermined default photographing mode is selected as the photographing mode. The resolution and the frame rate are selected, similarly to a case in which the subject position does not correspond to any monitoring region.

However, the subject present at a position closest to the field-of-view region is searched from the subject table 208, and in a case in which the positions of the subjects 107, 108 and 109 are outside the field-of-view region but the shortest distance to the field-of-view region is short (for example, in a case in which the distance is 20 cm or less), the photographing mode is selected in accordance with the field-of-view region part close to the subject position while assuming a case in which the subjects 107, 108, and 109 enter the field of view immediately afterwards.

Further, it is checked whether or not the field-of-view region part corresponds to the range 602 of any one monitoring region designated in the monitoring region table 206. If the field-of-view region part corresponds to the range 602 of any one monitoring region designated in the monitoring region table 206, the monitoring resolution and the monitoring frame rate designated for the region are selected. If the field-of-view region part does not correspond to the range 602 of any one monitoring region designated in the monitoring region table 206, the default resolution and the default frame rate are selected similarly to a case in which the subjects 107, 108, and 109 are detected.

The selected photographing range, the photographing mode, the resolution, and the frame rate are compared with the values recorded in the sensor table 205 (step 906). If there is a mismatched value, the selected photographing parameters are transmitted to the TOF sensors 101, 102, and 103 together with the time interval 507 to update the photographing parameters (step 907).

However, although the values do not match, a new photographing parameter may not be transmitted when a difference is somewhat small depending on circumstances. For example, in a case in which the size of the photographing range has a sufficient margin to enclose the subject, and the photographing range moves by several centimeters, even though photographing is continuously performed in the photographing range until now, since it is possible to detect all the subjects, there is low necessity to update the photographing range.

As described above, it is possible to reduce the communication volume and the parameter update process load of the TOF sensors 101, 102, and 103 by transmitting the photographing parameter only when a difference between the existing value and the selected value exceeds a threshold value. The transmitted photographing parameters are recorded in the photographing range 506, the photographing mode 508, the resolution 509, and the frame rate 510 of the sensor table 205.

In a case in which an instruction to end the program is given from the manager via the user interface 207, the execution of the program ends (step 908). Otherwise, it returns to step 902 to receive a new distance image.

Figure 10:
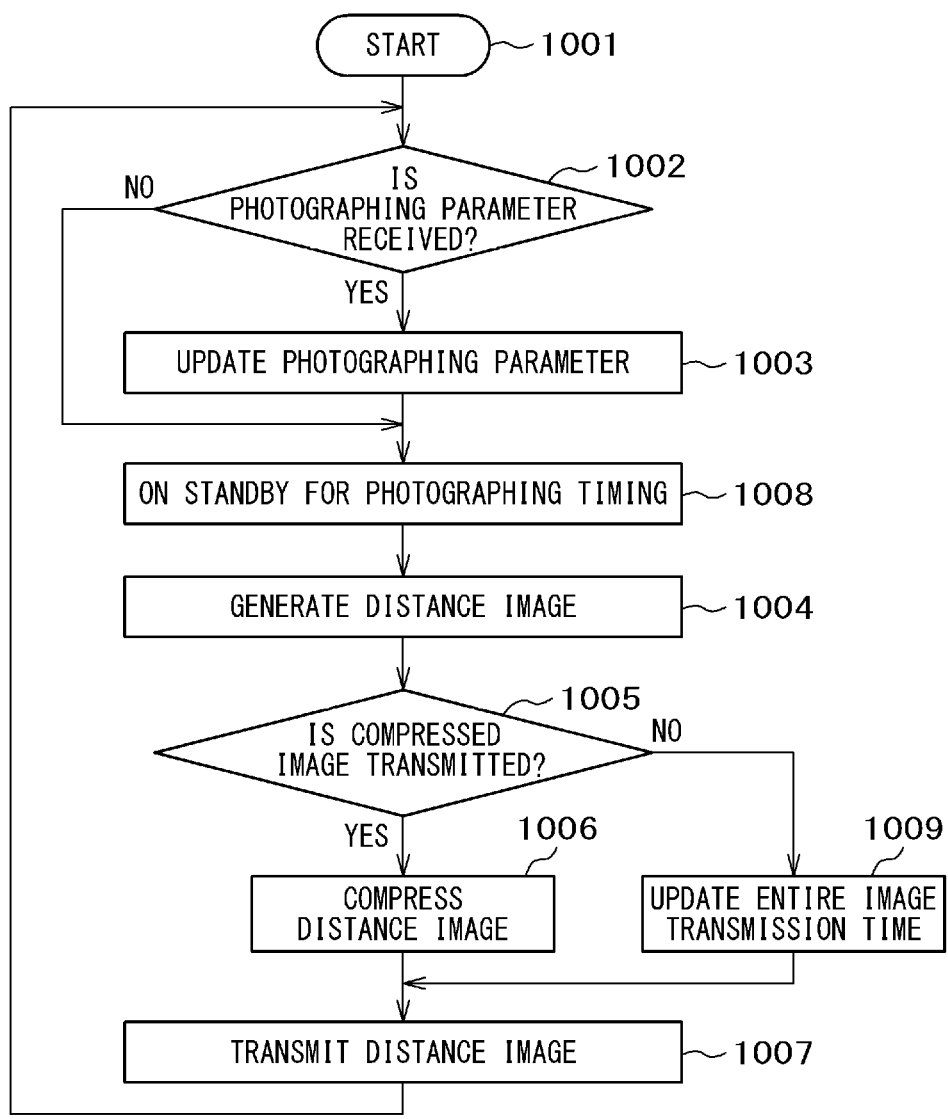
FIG. 10 is a diagram illustrating a flowchart of the TOF sensor control program of the first example.

FIG. 10 illustrates a flow in which the TOF sensor control program 304 changes the process in accordance with an instruction from the position information server 104 in order to reduce the communication volume to the position information server 104 and improve the position estimation accuracy for the subjects 107, 108, and 109.

First, it is checked whether or not the photographing parameter designation from the position information server 104 is received by the network interface 301 (step 1002), and if the photographing parameter designation is received, the designated parameters are recorded in the resolution 801, the frame rate 802, and the photographing range 803, and the photographing mode 805 of the photographing parameter 305 (step 1003).

Then, an elapsed time from previous distance image transmission is calculated from a current time acquired from the clock 306 and the image transmission time 807 and compared with the frame transmission interval which can be calculated from the frame rate 802. In a case in which the time interval from the previous transmission is too short, it is on standby until a time elapses (step 1008).

For example, it is on standby until half of an interval which can be calculated from the frame rate elapses. If a time appropriate for the frame rate elapses, the distance to the subject is measured by the imaging module 307 in the mode designated in the photographing mode 805, and the distance image is generated (step 1004). It is possible to generate a more accurate distance image using the photographing mode designated on the basis of the estimated positions of the subjects 107, 108, and 109.

Then, an elapsed time from the previous transmission of the entire image is calculated from the entire image transmission time 806 and the current time, and compared with the time interval 804 (step 1005). If the elapsed time is longer than a value designated in the time interval 804, the entire image transmission time 806 is updated to the current time, and the entire image is transmitted (step 1007).

Otherwise, the distance image is compressed in order to transmit a partial image including only pixels within a range designated by the photographing range 803 (1006), and the compressed distance image is transmitted to the position information server (step 1007). In both cases, the current time is recorded in the image transmission time 807 when the distance image is transmitted.

Figure 11:
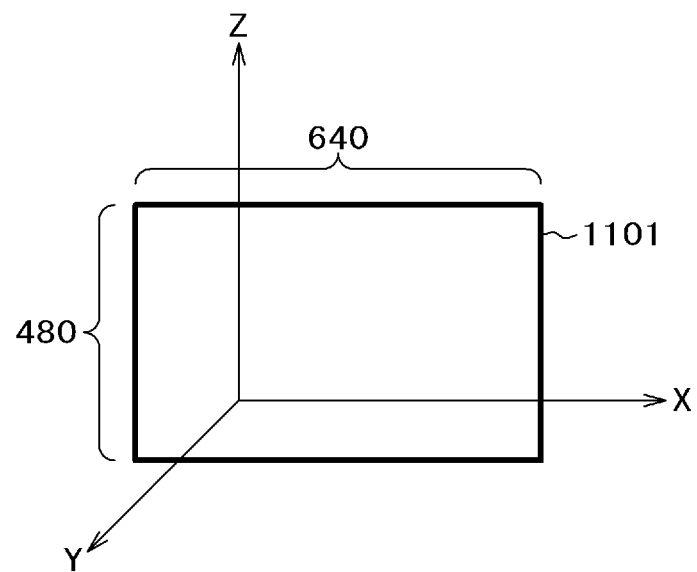
FIG. 11 is a diagram illustrating a configuration of a distance image.

If the distance image is compressed, a data amount is reduced by a general data compression technique, and pixels outside the designated range are deleted, and thus an information amount is reduced. There are several methods for the range designation and the data amount reduction as described below. FIG. 11 illustrates a distance image in which a field of view plane 1101 is divided into 640 (horizontal)×480 (vertical).

In general, it is possible to generate a distance image in which a position within a viewing plane is indicated by XY pixel coordinates, and a depth is indicated by a distance value of each pixel to a subject by projecting points located in a three-dimensional space having widths in three directions of the X axis, the Y axis, and the Z axis onto a plane. The distance image of the view plane 1101 intended for the entire field of view has 640×480 effective pixels, but in a case in which only some pixels in a partial range are necessary, the number of pixels can be reduced by designating the pixel coordinate range of the image.

Figure 12:
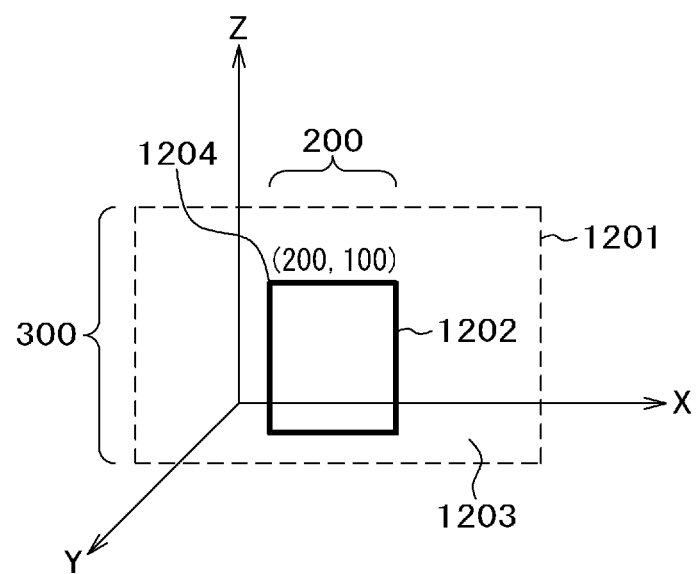
FIG. 12 is a diagram illustrating a distance image in which a transmission region is limited to a two-dimensional designation range.

For example, in FIG. 12, in a case in which only a range of 200 pixels in the horizontal direction and 300 pixels in the vertical direction from a pixel 1204 at a pixel position (200, 100) is necessary, only a range indicated by 1202 include valid pixels. As uniform invalid values (for example, all 0) are designated for pixels of a portion 1203 other than the designated range, data is compressed effectively, and thus the image data size is reduced.

Further, it is possible to reduce the size of the distance image by excluding invalid pixels and generating a 200×300 distance image with only the pixels in the necessary range 1202. In this case, metadata indicating a part of the distance image before compression corresponding to the pixels of the distance image as a header of image data or separate data.

Figure 13:
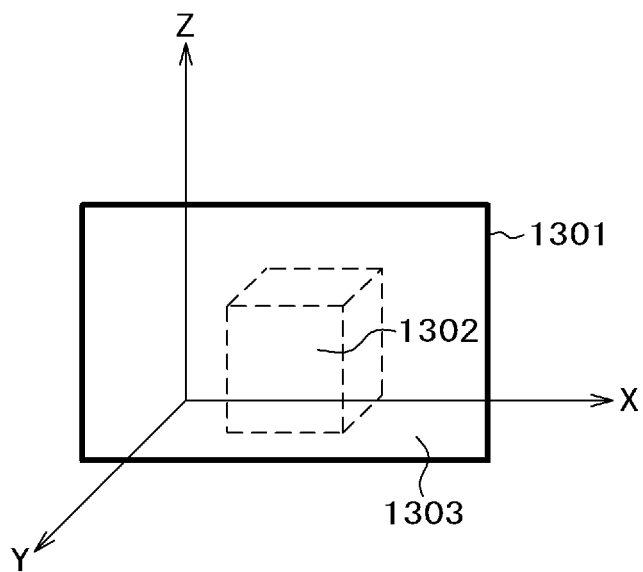
FIG. 13 is a diagram illustrating a distance image in which a photographing region is limited to a three-dimensional designation range.

In an example of FIG. 12, the range of pixels to be included in the distance image is indicated by the pixel coordinates on the image, and FIG. 13 illustrates an example in which the range of pixels to be included in the distance image is indicated by the three-dimensional space coordinates.

In FIG. 13, only the pixels corresponding to the subjects 107, 108, and 109 located in a region designated as a rectangular parallelepiped region 1302 are included in a distance image 1301. The subjects 107, 108, and 109 in the other regions are handled in the same way as when they do not exist, and invalid values are set to the corresponding pixels.

In the example of FIG. 12, valid pixels are necessarily included in the designated range of the distance image, but in a case in which the range is designated by the region of the three-dimensional space as illustrated in FIG. 13, that is not necessarily so. For example, in a case in which there is a subject which is large enough to hide the entire rectangular parallelepiped in front of the rectangular parallelepiped region 1302, since the subject is not detected within the designated range, the valid pixels are not included in the distance image at all. Since there are many invalid pixels having uniform values, the data is effectively compressed, and thus the image data size is reduced.

Figure 14:
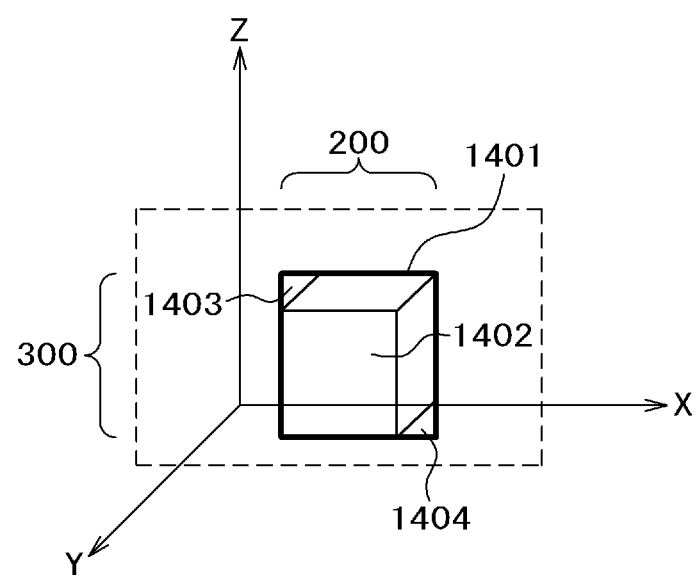
FIG. 14 is a diagram illustrating a distance image in which a transmission region is limited to a range of three-dimensional designation.

Even in a case in which the range is designated by the three-dimensional section coordinates, it is possible to reduce the image size by clipping a rectangle including a valid pixel portion 1402 as a small distance image 1401 as illustrated in FIG. 14. In this case, the invalid values are set to pixel portions 1403 and 1404 corresponding to the regions other than the designated range. Further, metadata indicating a part of the distance image before compression corresponding to the pixel of the distance image is provided as a header of image data or separate data.

As described above, according to the first example, it is possible to reduce the communication volume and alleviate stringency of the network band by causing the distance images transmitted from the TOF sensors 101, 102, and 103 to the position information server 104 to have only pixel information around the subject.

At the same time, the distance image of the entire field of view is periodically transmitted, and thus it is possible to detect the new subjects 107, 108, and 109 appearing at positions far from the existing subject positions. Furthermore, it is possible to acquire a more accurate distance image and improve the position estimation accuracy using the appropriate photographing mode in accordance with the subject position.

Further, the photographing mode, the resolution, and the frame rate which are appropriate are set in advance on the basis of the estimated positions of the subjects 107, 108, and 109 outside the field of view detected by the other TOF sensors 101, 102, and 103 for when the subjects 107, 108, and 109 enters the field of view. Accordingly, it is possible to improve the position estimation accuracy for the subjects 107, 108, and 109 entering the field of view in the future.

Second Example

A second example relates to a position estimation system in which measuring of distances to the subjects 107, 108, and 109 and estimating of the joint position are performed through the TOF sensors 101, 102, and 103, and aggregating of the joint positions transmitted from a plurality of TOF sensors 101, 102, and 103 is performed through the position information server 104. Hereinafter, only parts different from the first example will be described with reference to the appended drawings.

A configuration of a position information server 104 of the second example will be described with reference to FIG. 17.

A position information server control program 1701, a sensor table 1702, a subject model table 1703, an estimation parameter table 1704, and a subject table 1705 are stored in a memory 203 of the position information server 104. A clock 1706 provides the current time, similarly to the clock 306 in the first example.

The position information server control program 1701 has the respective functions illustrated in FIG. 15. In the second example, the estimated joint positions of the subjects 107, 108 and 109 are transmitted instead of the distance images from the TOF sensors 101, 102, and 103. A joint position reception function 1501 receives the joint positions of the subjects 107, 108, and 109 estimated by the TOF sensors 101, 102, and 103.

A subject model selection function 1502 selects features of the subjects 107, 108, and 109 such as a physique or a posture on the basis of the received joint position. An estimation parameter selection function 1503 selects an estimation parameter appropriate for estimating the joint position of the subject of the selected feature. An estimation parameter transmission function 1504 transmits the selected estimation parameter to the TOF sensors 101, 102, and 103. A joint position provision function 1505 and a management function 1506 are functions similar to those of the first example.

The sensor table 1702 includes elements illustrated in FIG. 16 for the respective TOF sensors 101, 102, and 103.

An estimation subject model number 1604 holds the number of the subject model used for the estimation of the subject position at the present time point. A detection subject model number 1605 holds the number of the subject model selected by the subject model selection function. A subject model detection time 1606 holds a first detection time when the same subject model is selected consecutively. A switching interval 1607 holds a value designated by the manager as a period of time in which the selection of the same detection subject model continues until the estimation subject model is switched.

Figures 17, 18:
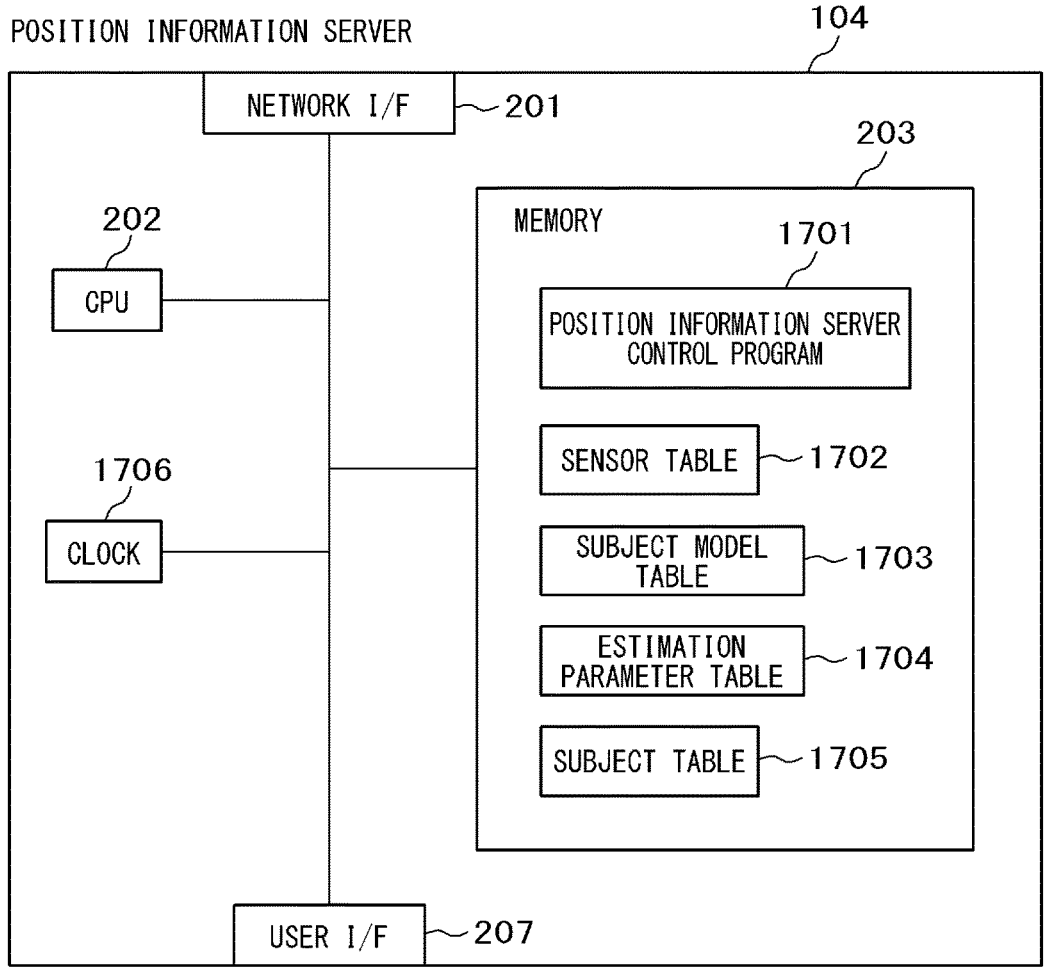
FIG. 17 is a diagram illustrating a configuration of a position information server of the second example.
FIG. 18 is a diagram illustrating a configuration of a subject model table of the second example.

The subject model table 1703 records features of each predefined subject model and includes elements illustrated in FIG. 18 for each subject model.

A subject model number 1601 is an identifier uniquely identifying the subject model. A minimum shoulder width 1802 and a maximum shoulder width 1803 are a minimum value and a maximum value of a distance between two shoulder joints in the subject model. A minimum header-floor distance 1804 and a maximum header-floor distance 1805 are a minimum value and a maximum value of a header-floor distance in the subject model.

The number of persons 1806 is the number of subjects in the subject model. The number of persons may not be the strict number of persons but may be designated as N or more, or N or less. A density 1807 indicates closeness of the subjects 107, 108, and 109 in the subject model, and is indicated by, for example, a range of an average distance between the subjects.

The estimation parameter table 1704 records predefined estimation parameters suitable for each subject model and includes elements illustrated in FIG. 19 for each subject model.

A subject model number 1901 is an identifier uniquely identifying the subject model. A minimum shoulder-elbow distance 1902 and a maximum shoulder-elbow distance 1903 are a minimum value and a maximum value of a distance (an upper arm length) between a shoulder joint and an elbow joint in the subject model. An estimator 1904 is a joint position estimator that performs machine learning in accordance with the subject model.

The estimation accuracy can be improved by limiting the estimation parameters to the subjects 107, 108, and 109. For example, in the case of the estimation process targeting at a wide range of subjects 107, 108 and 109 from adults to children, it is necessary to widen the range of the shoulder-elbow distance. For this reason, the joint position is likely to be estimated by applying the shoulder-elbow distance for children to the subjects 107, 108, and 109 who are adult, leading to an erroneous estimation result.

In a case in which the subjects 107, 108, and 109 are known to be adults, such erroneous estimation can be excluded by applying a threshold value of an adult shoulder-elbow distance. Similarly, the estimator 1904 that deeply learns the subjects 107, 108, and 109 having specific features can estimate more accurately than an estimator that learns a wide range of subjects 107, 108, and 109 shallowly.

As illustrated in FIG. 26, the subject table 1705 records a subject model number 2607 of each subject in addition to the elements similar to those of the first example.

Figure 22:
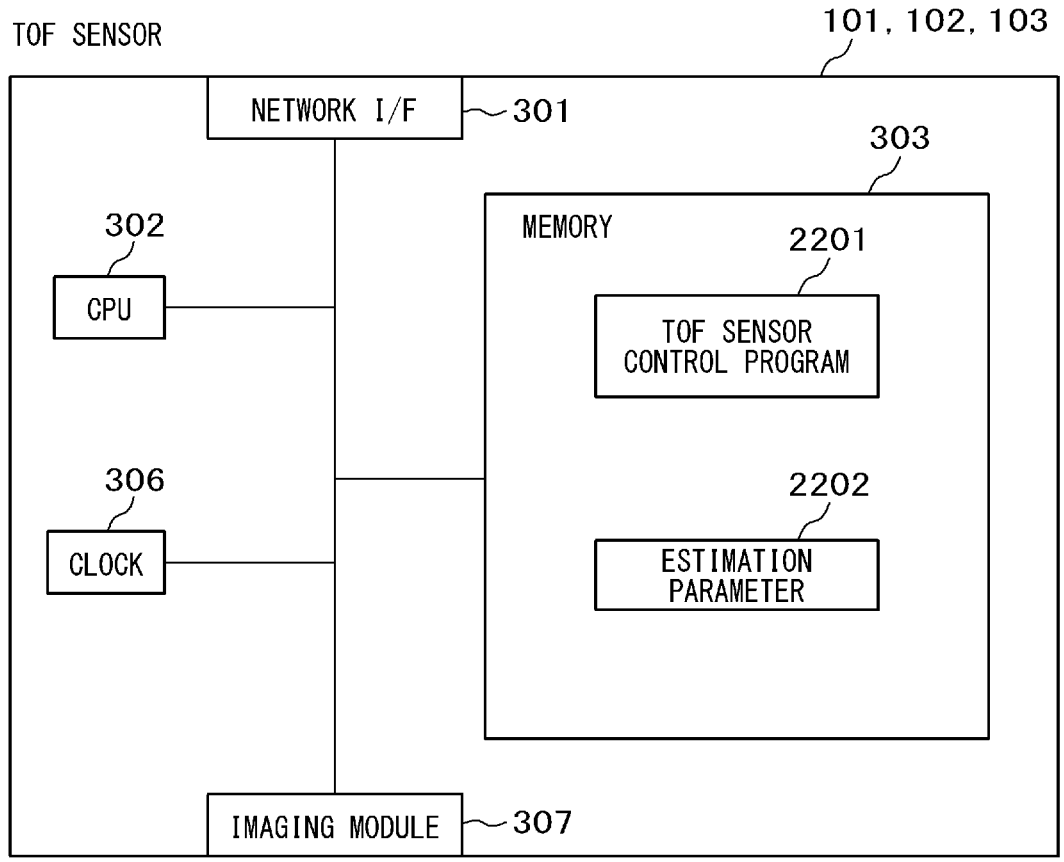
FIG. 22 is a diagram illustrating a configuration of a TOF sensor of the second example.

A configuration of the TOF sensors 101, 102, and 103 will be described with reference to FIG. 22.

Figure 23:
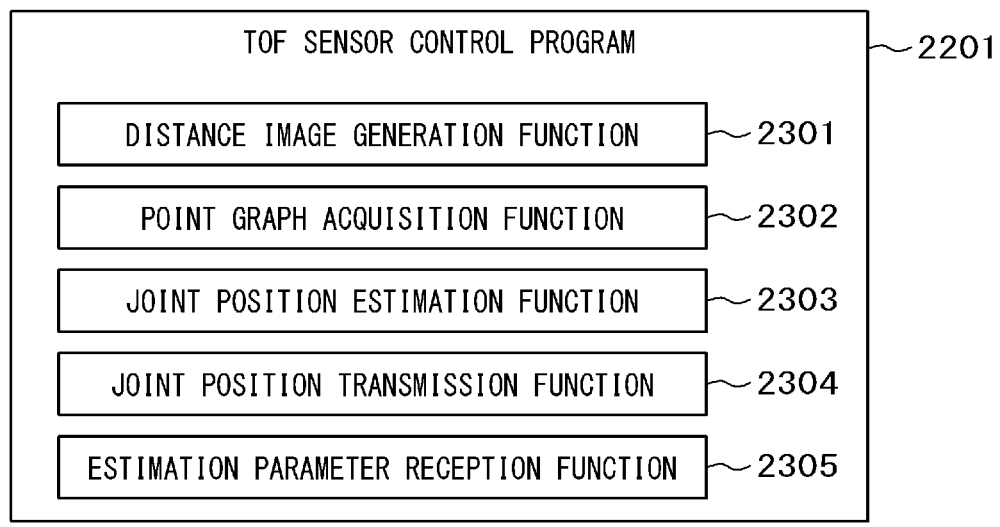
FIG. 23 is a diagram illustrating a configuration of a TOF sensor control program of the second example.

A memory 303 of each of the TOF sensors 101, 102, and 103 stores a TOF sensor control program 2201 and an estimation parameter 2202. The TOF sensor control program 2201 has respective functions illustrated in FIG. 23.

A distance image generation function 2301, a point group acquisition function 2302, and a joint position estimation function 2303 are functions similar to the corresponding functions 701, 402, and 403 of the first example, respectively. However, the joint position estimation function 2303 is different from that of the first example in that it uses the estimation parameter received from the position information server at the time of estimation as will described later.

The joint position transmission function 2304 transmits the estimated joint position to the position information server 104. The estimation parameter reception function 2305 receives the estimation parameter transmitted from the position information server 104 and stores the estimation parameter in the memory 303 as the estimation parameter 2202.

Figure 24:
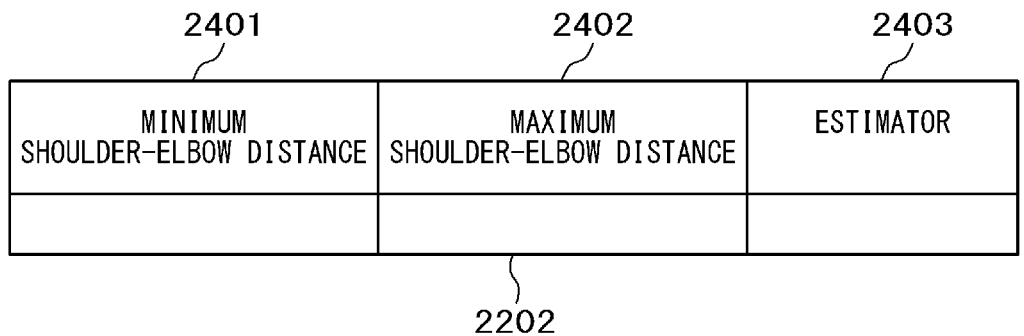
FIG. 24 is a diagram illustrating a configuration of an estimation parameter of the TOF sensor of the second example.

The estimation parameter 2202 includes elements illustrated in FIG. 24. A minimum shoulder-elbow distance 2401, a maximum shoulder-elbow distance 2402, and an estimator 2403 are values recorded as a minimum shoulder-elbow distance 1902, a maximum shoulder-elbow distance 1903, and an estimator 1904 of the estimation parameter table 1704, respectively.

Figure 21:
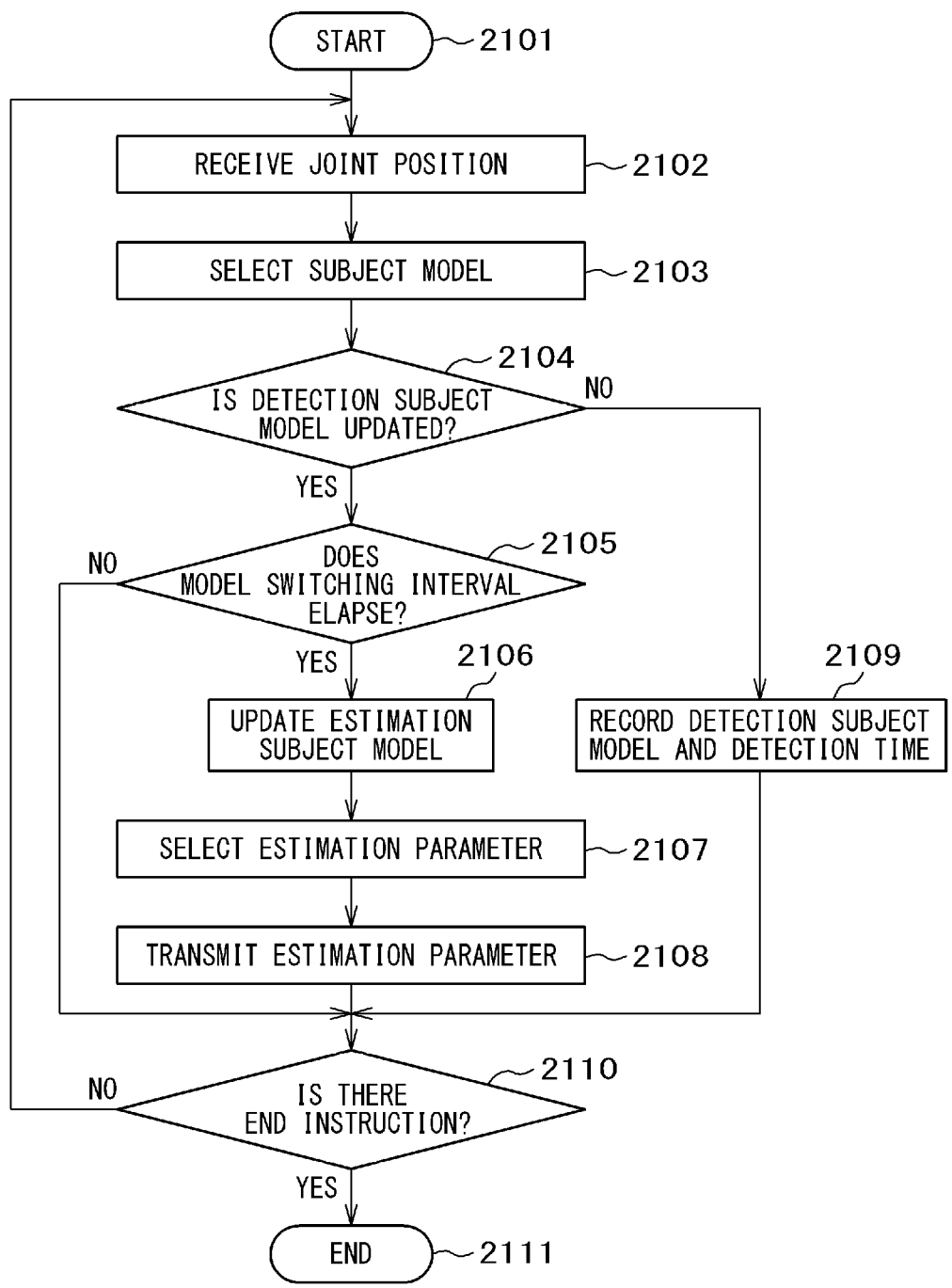
FIG. 21 is a diagram illustrating a flowchart of the position information server control program of the second example.

FIG. 21 illustrates a flow in which the position information server control program 204 gives a process change instruction to the TOF sensors 101, 102, and 103 in order to improve the position estimation accuracy for the subjects 107, 108, and 109.

If execution of the program is started, the position information server control program 204 receives the estimated joint positions of the subjects 107, 108 and 109 from the TOF sensors 101, 102, and 103, and if the subjects 107, 108, and 109 are detected, the position information server control program 204 records the joint positions in the subject table 1705 (step 2102).

The received joint positions are compared with the features of each model defined in the subject model table, and one corresponding subject model is selected and recorded in the subject model number 2607 of the subject table 1705 (step 2103). For example, the distance between the estimated positions of both shoulder joints is calculated as the shoulder width, and it corresponds to a model in which the minimum shoulder width 1802 is small, and the maximum shoulder width 1803 is large. Similarly, the header-floor distance, the number of subject persons, and the density from the estimation results of various joint positions are also compared with the values defined in the subject model table.

If there is no corresponding subject model, a default subject model predetermined as a general-purpose model is selected. Further, when the subjects 107, 108, and 109 are not detected, the default subject model is similarly selected. However, the subjects 107, 108, and 109 located at the positions closest to the field-of-view region are searched from the subject table 1705, and in a case in which the positions of the subjects 107, 108 and 109 are outside the field-of-view region but the shortest distance to the field-of-view region is short, the subject models of the subjects 107, 108, and 109 are selected while assuming a case in which the subjects 107, 108, and 109 enter the field of view immediately afterwards.

If the number of the selected subject model is different from the number recorded in the detection subject model number 1605 (step 2104), the selected model number is recorded in the detection subject model number 1605, and the current time is recorded in the subject model detection time 1606 (step 2109). Otherwise, a duration of the detected subject model is calculated from the difference between the current time and the value recorded in the subject model detection time 1606 and is compared with the value recorded in the switching interval 1607 (step 2105).

If the selected subject model number is different from the estimation subject model number and the duration exceeds the period of time designated as the switching interval, the estimation subject model number 1604 is updated to the selected subject model number (step 2106), and an estimation parameter corresponding to the subject model number is selected from the estimation parameter table 1704 (step 2107). Finally, the selected estimation parameter is transmitted to the TOF sensors 101, 102, and 103 (step 2108).

Figure 25:
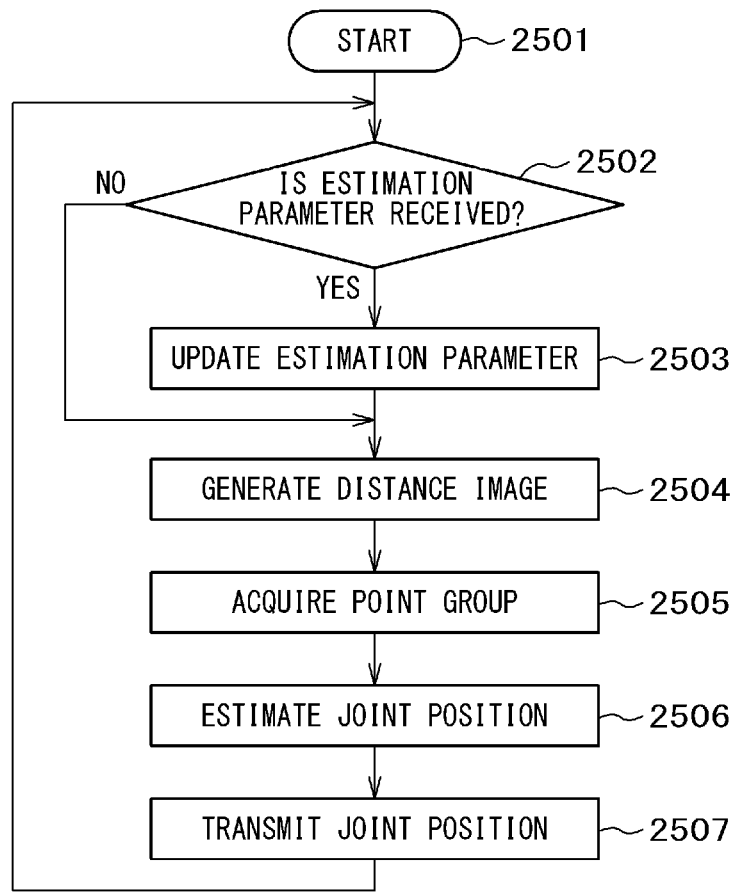
FIG. 25 is a diagram illustrating a flowchart of the TOF sensor control program of the second example.

FIG. 25 illustrates a flow in which the TOF sensor control program 2201 changes the process in accordance with an instruction from the position information server 104 in order to improve the position estimation accuracy for the subjects 107, 108, and 109.

First, it is checked whether the designation of the estimation parameter from position information server is received (step 2502), and if the designated is received, the designated parameter is recorded as the estimation parameter 2202 (step 2203).

Then, similarly to the first example, the distance image is generated (step 2504), and a point group is acquired for the joint position estimation (step 2505). Further, the joint position of the subject is estimated using the shoulder-elbow distance ranges 2401 and 2402 and the estimator 2403 recorded in the estimation parameter 2202 (step 2506).

Finally, the estimation result is transmitted to the position information server (step 2507).

As described above, according to the second example, the position estimation accuracy can be improved by recognizing the feature of the subject from the estimation result of the joint position and using the estimation parameter suitable for the feature.

Further, the appropriate estimation parameters are set in advance on the basis of the estimated positions of the subjects 107, 108, and 109 outside the field of view detected by the other TOF sensors 101, 102, and 103 and the features of the subjects 107, 108, and 109 for when the subjects 107, 108, and 109 enters the field of view. Accordingly, it is possible to improve the position estimation accuracy for the subjects 107, 108, and 109 entering the field of view in the future.

The invention claimed is:

1. A position estimation system, comprising:
   at least one distance sensor and a position information server which are connected via a network,
   wherein the distance sensor measures a distance to a subject, generates information related to a position of the subject, and transmits the generated position information to the position information server,
   the position information server receives the position information of the subject from the distance sensor, decides a position information generation process to be executed by the distance sensor on the basis of the received position information, and transmits instruction information related to the decided position information generation process to the distance sensor, wherein the position information transmitted by the distance sensor includes a distance image, wherein the position information server estimates a position of each part of the subject on the basis of the distance image, wherein the instruction information related to the position information generation process transmitted by the position information server includes information related to a range of a three-dimensional space serving as a photographing target of the distance image, and the distance sensor sets an invalid value to pixels corresponding to the subject located outside the range of the three-dimensional space designated by the instruction information for the distance image to be transmitted.

2. The position estimation system according to claim 1, wherein the position information server decides a range of the three-dimensional space serving as the photographing target of the distance sensor on the basis of a distribution of pixels of the received distance image in the three-dimensional space.

3. The position estimation system according to claim 1, wherein the position information server decides the range of the three-dimensional space serving as the photographing target of the distance sensor on the basis of an estimated position of the subject estimated from the received distance image.

4. The position estimation system according to claim 1, wherein the instruction information related to the position information generation process transmitted by the position information server includes a photographing mode which the distance sensor uses to photograph the subject, and the distance sensor generates the distance image on the basis of distance data photographed in the photographing mode and transmits the distance image to the position information server.

5. A position estimation system, comprising:

at least one distance sensor and a position information server which are connected via a network, wherein the distance sensor measures a distance to a subject, generates information related to a position of the subject, and transmits the generated position information to the position information server, wherein the position information server receives the position information of the subject from the distance sensor, decides a position information generation process to be executed by the distance sensor on the basis of the received position information, and transmits instruction information related to the decided position information generation process to the distance sensor, wherein the position information transmitted by the distance sensor includes a distance image, wherein the position information server estimates a position of each part of the subject on the basis of the distance image, wherein the instruction information related to the position information generation process transmitted by the position information server includes information designating an interval for transmitting the distance image, and wherein the distance sensor transmits the distance image to the position information server at the designated interval.

6. A position estimation system, comprising:

at least one distance sensor and a position information server which are connected via a network, wherein the distance sensor measures a distance to a subject, generates information related to a position of the subject, and transmits the generated position information to the position information server, wherein the position information server receives the position information of the subject from the distance sensor, decides a position information generation process to be executed by the distance sensor on the basis of the received position information, and transmits instruction information related to the decided position information generation process to the distance sensor, wherein the position information transmitted by the distance sensor includes a distance image, wherein the position information server estimates a position of each part of the subject on the basis of the distance image, wherein the instruction information related to the position information generation process transmitted by the position information server includes information specifying a resolution of the distance image, and wherein the distance sensor generates the distance image on the basis of the designated resolution and transmits the distance image to the position information server.

7. A position estimation system, comprising:

at least one distance sensor and a position information server which are connected via a network, wherein the distance sensor measures a distance to a subject, generates information related to a position of the subject, and transmits the generated position information to the position information server, wherein the position information server receives the position information of the subject from the distance sensor, decides a position information generation process to be executed by the distance sensor on the basis of the received position information, and transmits instruction information related to the decided position information generation process to the distance sensor, wherein the position information transmitted by the distance sensor includes an estimated position of the subject, wherein the instruction information related to the position information generation process transmitted by the position information server includes information designating an estimation parameter which the distance sensor uses to estimate a position of the subject, and wherein the distance sensor estimates the position of the subject using the designated estimation parameter.

8. The position estimation system according to claim 7, wherein the position information server decides the estimation parameter which the distance sensor uses to estimate the position of the subject on the basis of the received estimated position of the subject.

9. The position estimation system according to claim 7, wherein the estimation parameter transmitted by the position information server includes a threshold value related to a body structure of the subject.

10. The position estimation system according to claim 9, wherein the threshold value related to the body structure of the subject includes at least a minimum shoulder-elbow distance and a maximum shoulder-elbow distance as the body structure of the subject.

* * * * *